United States Patent [19]

Wyatt et al.

[11] Patent Number: 4,567,561
[45] Date of Patent: Jan. 28, 1986

[54] LARGE SCALE INTEGRATION DATA PROCESSOR SIGNAL TRANSFER MECHANISM

[75] Inventors: Virgil D. Wyatt, Lighthouse Point; Wayne R. Kraft, Coral Springs; Nandor G. Thoma, Boca Raton, all of Fla.

[73] Assignee: International Business Machines Corp., Purchase, N.Y.

[21] Appl. No.: 334,185

[22] Filed: Dec. 24, 1981

[51] Int. Cl.[4] .............................................. G06F 9/00
[52] U.S. Cl. .............................................................. 364/200
[58] Field of Search ... 364/200 MS File, 900 MS File

[56] References Cited

U.S. PATENT DOCUMENTS

| | | | |
|---|---|---|---|
| 3,938,094 | 2/1976 | Caudel | 340/172.5 |
| 4,045,684 | 8/1977 | Eads et al. | 307/200 B |
| 4,075,606 | 2/1978 | Wilkens | 340/147 B |
| 4,144,589 | 3/1979 | Baker et al. | 365/203 |

Primary Examiner—Gareth D. Shaw
Assistant Examiner—John G. Mills
Attorney, Agent, or Firm—Richard E. Bee

[57] ABSTRACT

A digital data signal transfer mechanism is provided for use in large scale integration digital data processor circuitry formed on an integrated circuit chip. The signal transfer mechanism includes a plural-bit data bus formed on the integrated circuit chip for transferring plural-bit binary data signals between different locations on the chip. The signal transfer mechanism also includes plural-bit signal source circuitry and plural-bit signal destination circuitry formed on the integrated circuit chip and coupled to the plural-bit data bus for respectively supplying plural-bit data signals to and receiving plural-bit data signals from the bus. The signal transfer mechanism further includes processor control circuitry coupled to the signal source and signal destination circuitry for enabling the signal source circuitry to put a plural-bit data signal onto the data bus during a first processor control cycle and for enabling the signal destination circuitry to take in this plural-bit data signal from the bus during a second and different processor control cycle. The inherent capacitance of the plural-bit data bus serves to store the plural-bit data signal during the first and second and any intervening processor control cycles.

10 Claims, 4 Drawing Figures

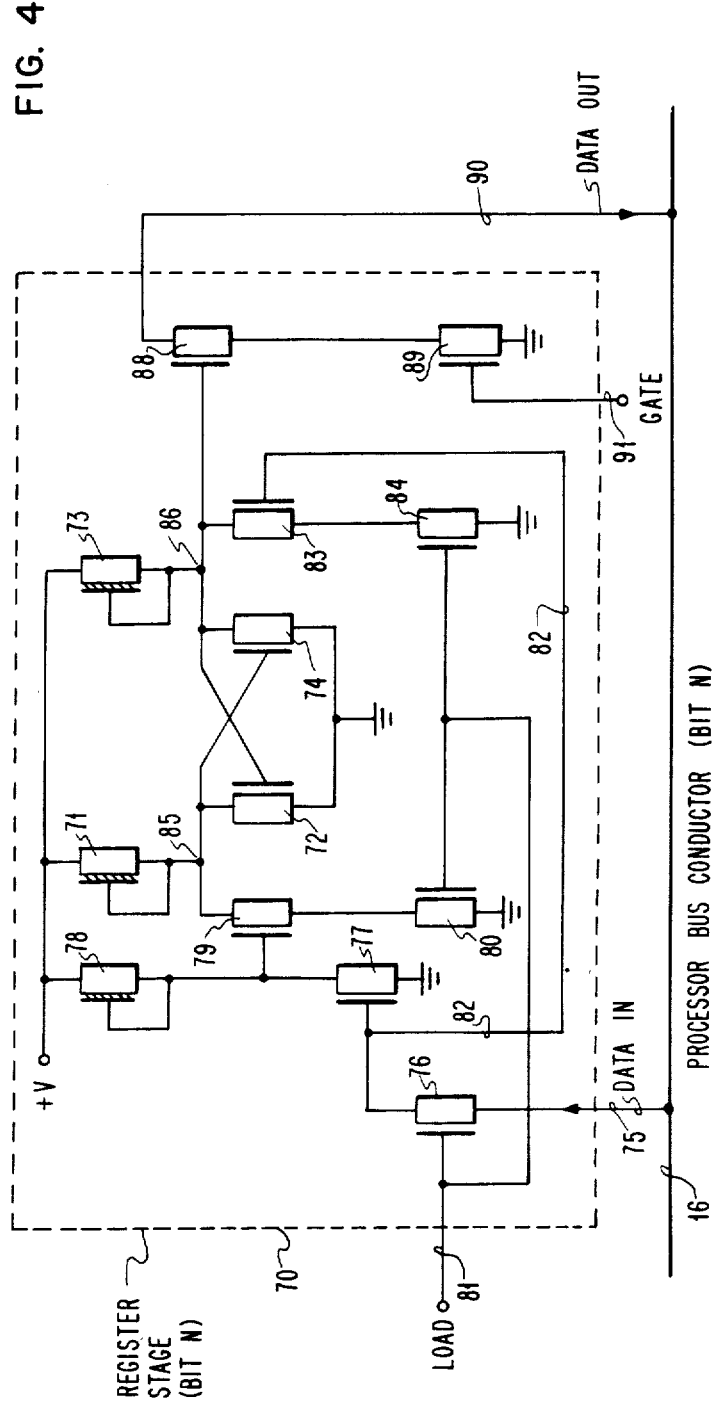

LARGE SCALE INTEGRATION DATA PROCESSOR SIGNAL TRANSFER MECHANISM

DESCRIPTION

1. Technical Field

This invention relates to large scale integration digital data processor circuitry formed on an integrated circuit chip and to signal transfer mechanisms included in such circuitry for transferring multi-bit binary signals between different locations on the chip.

2. Background Art

In the design of large scale integration data processor circuitry, an overall objective is to increase the number of data processing functions that can be provided on a single integrated circuit chip. One goal that is sometimes sought is to provide a complete data processor or digital computer on a single chip. This has been accomplished with varying degrees of success, depending in part upon one's definition of what is needed to constitute a complete data processor and depending in part upon the capabilities and performance level of the so-called data processor.

In any event, there is room for improvement in the design of digital data processor mechanisms to be implemented on integrated circuit chips. There is room for improvement in the number of circuit elements needed to perform various data processing functions on a chip. There is room for improvement in the amount of power dissipated by the data processor circuitry. There is room for improvement in the speed of performance of the data processing functions. In short, there is a continuing need for integrated circuit chip mechanisms which will reduce hardware requirements, reduce the power dissipation and increase the performance speed for one or more of the data processing functions provided on a chip.

SUMMARY OF INVENTION

This invention provides an improved integrated circuit signal transfer mechanism for transferring multi-bit binary data signals from one location to another on an integrated circuit chip. This invention makes use of the fact that the integrated circuit signal buses used to interconnect registers and other functional units on the chip are capacitive in nature. In particular, the present invention uses such a signal bus as a storage device, with the inherent bus capacitance providing the storage medium. This technique can be used, for example, to buffer data without need for the customary buffer register hardware. This not only reduces the hardware requirements, but also increases the performance speed in that no additional steps are required to move the data into or out of a separate buffer register.

The use of the signal bus as a storage device also enables a simplification of the circuitry needed in the various registers coupled to the bus. The nature of this simplification reduces the power dissipation associated with such registers. This is accomplished by constructing the output circuits of the registers so that they provide only a bus discharge path for their respective bus conductors. At the same time, a separate set of precharge circuits is provided which can be used in a shared manner for each of the registers. The precharge circuits charge all of the bus conductors in a first time interval. The register to be used as the signal source register is then enabled during a subsequent time interval to discharge the appropriate bus conductors to produce on the bus a plural-bit binary signal corresponding to the plural-bit binary signal residing in the source register.

The use of a single set of precharge circuits and the capacitance of the signal bus to store the precharged condition considerably reduces the power handling requirements of the various registers and reduces the amount of chip area required for the fabrication of such registers. At the same time, the precharging of the signal bus can normally be accomplished in a prior time interval during which some other activity is taking place in the data processor. Thus, in practice, there is very little, if any, impact on the performance of the data processor.

Further advantages may be realized from the use of the separate set of precharge circuits. With minor modifications to allow for selective discharging as well as selective precharging of bus conductors, this circuitry can be utilized to provide an efficient mechanism for masking or modifying on a selective bit basis the contents of a data register coupled to the signal bus. This circuitry can be further utilized to provide an efficient mechanism for generating preprogrammed multi-bit binary number values on the signal bus for use by one or more of the functional units coupled to the bus.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings

FIG. 3 is a chart used in explaining the operation of the precharge/discharge circuits of FIG. 2;

and FIG. 4 shows in greater detail the construction of one of the bit stages in one of the data registers of FIG. 2.

DESCRIPTION OF THE PREFERRED EMBODIMENT

Figure 1:
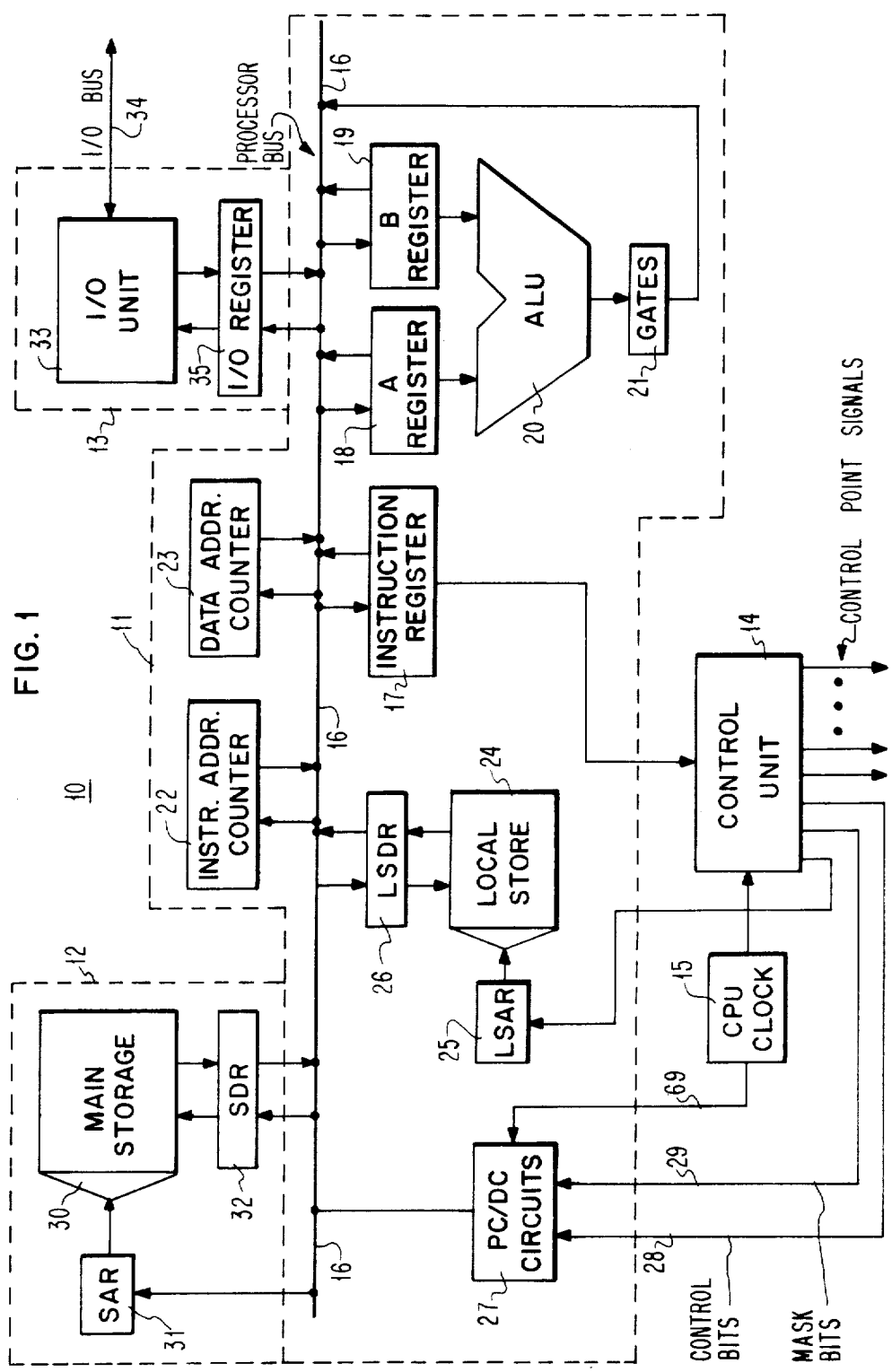
FIG. 1 is a functional block diagram of a digital data processor having incorporated therein an improved signal transfer mechanism constructed in accordance with the present invention.

Referring to FIG. 1, there is shown a functional block diagram of a digital computer or data processor 10 which is particularly suitable for fabrication on large scale integration (LSI) type integrated circuit chips. This data processor 10 includes a data flow unit 11, a main storage unit 12, an input/output (I/O) unit 13, a control unit 14 and a clock generator 15. The data flow unit 11 is sometimes called a central processing unit (CPU) and includes such things as an arithmetic and logic unit (ALU), various hardware registers and counters, a local storage unit and a bus system interconnecting these items with one another. The data flow unit 11 is the unit that does the adding, subtracting, rearranging and other manipulation of the data to produce the desired results. The control unit 14 controls the operation of the data flow unit 11, the main storage unit 12 and the I/O unit 13 by way of various control point signals which are supplied to the various functional mechanisms located in these units.

The improved signal transfer mechanism of the present invention includes a plural-bit bus formed on the integrated circuit chip for transferring plural-bit binary signals between different locations on the chips. In the present embodiment, this plural-bit bus is represented by a multi-conductor processor bus 16 which is used to interconnect the various registers, counters and other functional units located in the data flow unit 11. For sake of example, the processor bus 16 is assumed to be a 16-bit or 16-conductor bus. Consistent therewith, the various registers and counters coupled to the processor bus 16 are assumed to be 16-stage or 16-bit registers and counters.

The data flow unit 11 includes an instruction register 17, an A register 18 and a B register 19, each of which has both its input circuitry and its output circuitry coupled to the processor bus 16 for supplying plural-bit binary signals thereto and receiving plural-bit binary signals therefrom. The A and B registers 18 and 19 drive an arithmetic and logic unit (ALU) 20, the output of which is coupled to the processor bus 16 by way of a set of 16 parallel gating circuits 21. The data flow unit 11 also includes an instruction address counter 22 and a data address counter 23 which are coupled to the processor bus 16 for providing storage addresses for the main storage unit 12.

The data flow unit 11 further includes a local storage unit 24 having associated therewith a local storage address register (LSAR) 25 and a local storage data register (LSDR) 26. LSDR 26 is coupled to the processor bus 16 for use in transferring binary data from the processor bus 16 to the local storage unit 24 and vice versa. Local storage unit 24 includes various general purpose registers for temporarily storing data and the like during the performance of the user program being performed by the data processor 10. For simplicity of explanation, LSAR 25 is assumed to receive local storage addresses from the control unit 14.

The data flow unit 11 also includes a set of precharge/discharge (PC/DC) circuits 27 for use in selectively precharging and discharging the individual conductors or lines in the processor bus 16. This precharge/discharge circuitry 27 will be discussed in greater detail hereinafter. Such circuitry 27 receives certain control bits and mask bits from the control unit 14 by way of control point signal buses 28 and 29, respectively. It also receives CPU clock pulses or timing pulses from the clock pulse generator 15.

The main storage unit 12 includes a main storage mechanism 30, a storage address register (SAR) 31 and a storage data register (SDR) 32. SAR 31 is coupled to the processor bus 16 for receiving storage addresses from the instruction and data address counters 22 and 23. SDR 32 is also coupled to the processor bus 16 for transferring data, instructions and the like from the main storage mechanism 30 to the processor bus 16 or vice versa.

The I/O unit 13 includes an I/O unit 33 which is coupled to an I/O bus 34 which runs to various peripheral units associated with the data processor 10. I/O unit 33 is coupled to the processor bus 16 by way of an I/O register 35. I/O register 35 is used to transfer data from the I/O unit 33 to the processor bus 16 and vice versa.

The user program to be performed by the data processor 10 is initially loaded into the main storage unit 30 from one of the peripheral units coupled to the I/O bus 34. This is accomplished by way of the I/O unit 33, the I/O register 35, the processor bus 16 and the storage data register 32. Thereafter, the user program is performed by reading from the main storage unit 30 in a sequential manner the various processor instructions which make up the user program. Each processor instruction, in its turn, is transferred by way of SDR 32 to the processor bus 16. It is then loaded into the instruction register 17 to identify to the control unit 14 the series of control actions that need to be provided by the control unit 14 in order to execute such processor instruction.

The processor instruction loaded into the instruction register 17 may, for example, be a request to add a first operand residing in the local store 24 to a second operand located at a particular address in the main storage unit 30 and to store the results of such addition back into the local store 24. In response to such an instruction, the control unit 14 would activate the appropriate control point signals to cause the data flow unit 11 to fetch the second operand from the main storage unit 30 and to load it into the A register 18. Control unit 14 would then cause the first operand to be transferred from the local store 24 to the B register 19. The ALU 20 would be instructed to add the contents of the A and B registers 18 and 19. When the results of the addition appears at the output of ALU 20, the control unit 14 would thereafter cause such results to be supplied back to and stored into the local store 24. As a concluding part of the current instruction, the control unit 14 would cause the next processor instruction to be fetched from the main storage unit 30 and loaded into the instruction register 17.

The improved signal transfer mechanism of FIG. 1 further includes a plural-bit signal source mechanism formed on the integrated circuit chip and coupled to the plural-bit processor bus 16 for supplying plural-bit binary signals thereto. This signal source mechanism can be any one of the registers 17,18, 19,26,32 and 35. It can also be one of the counters 22 and 23 or the ALU 20 and its output gates 21. The appropriate signal source mechanism is selected by activating the control point signal line which runs from the control unit 14 to the output gating terminal of the source mechanism to be selected. In the case of ALU 20, this control point line runs to the ALU output gates 21. For simplicity of illustration, the connections of the various control point signal lines to their respective signal source mechanisms is not shown in the drawings.

The improved signal transfer mechanism of FIG. 1 also includes a plural-bit signal destination mechanism formed on the integrated circuit chip and coupled to the plural-bit processor bus 16 for receiving plural-bit binary data signals therefrom. This signal destination mechanism can be any one of registers 17,18,19,26,31,32 and 35. It can also be either one of the address counters 22 and 23. The appropriate signal destination mechanism is selected by activating the control point signal line which runs from the control unit 14 to the load control terminal of the destination mechanism to be selected.

The improved signal transfer mechanism of FIG. 1 further includes processor control circuitry coupled to the signal source mechanisms and to the signal destination mechanisms for enabling a particular signal source mechanism to put its binary signal onto the processor bus 16 and for enabling a particular signal destination mechanism to take in this binary signal from the processor bus 16. This processor control circuitry is represented by the control unit 14 and the various control point signal lines emanating therefrom and running to the different signal source and signal destination mechanisms.

For sake of example herein, the control unit 14 is assumed to be of the microprogrammed type. As such, it is assumed to include a microword control storage mechanism which produces for each processor instruction resident in the instruction register 17 a sequence of microwords for controlling the execution of such processor instruction. Control unit 14 is further assumed to include control circuitry responsive one at a time to the microwords from the control storage mechanism for producing for each microword a plurality of control point signals for controlling the operation of the data processor 10 for one processor control cycle. A processor control cycle will sometimes be referred to herein as a "microword cycle".

Figure 2:
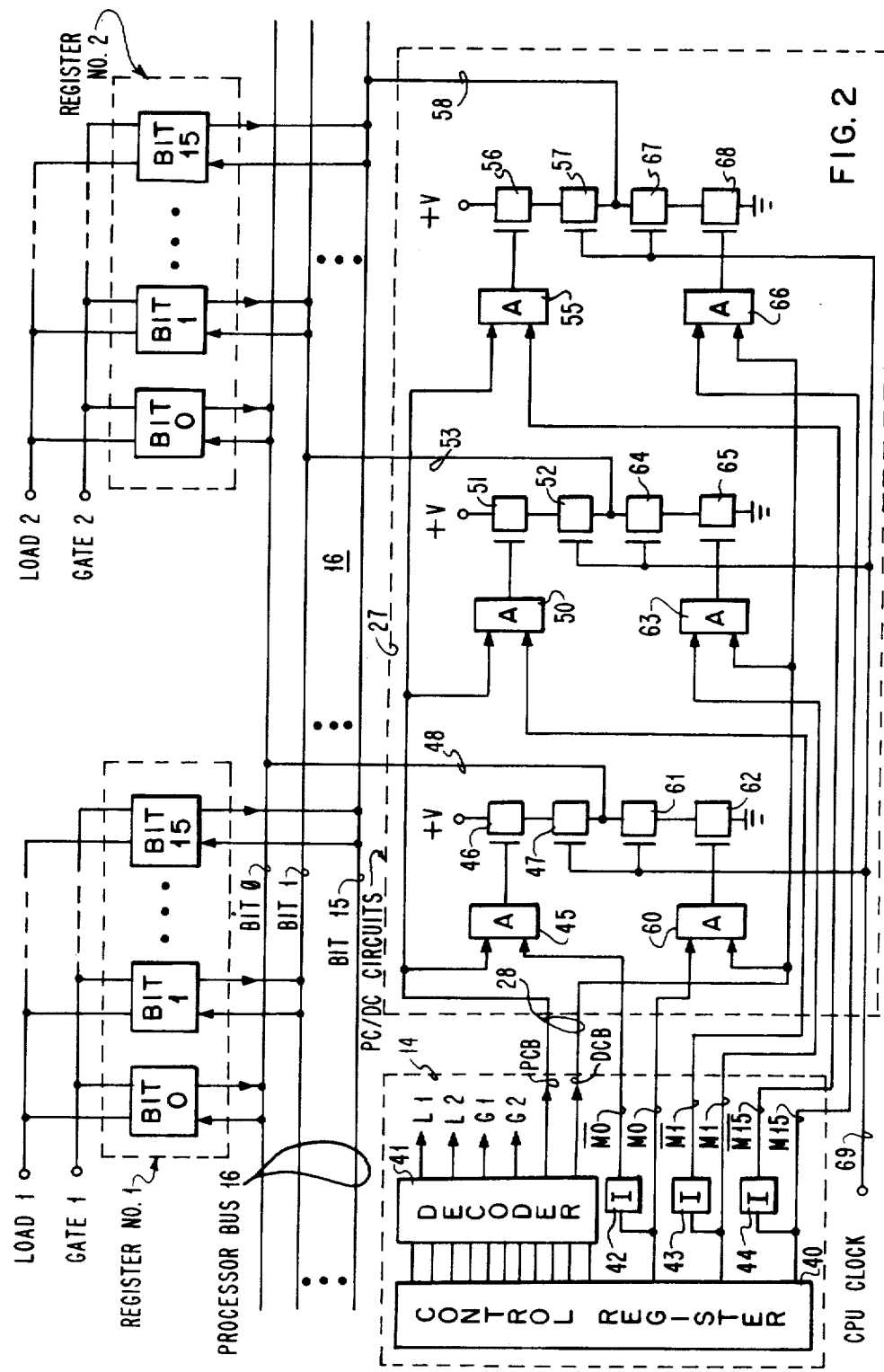
FIG. 2 shows in greater detail the construction of certain data registers and precharge/discharge circuits of FIG. 1.

Referring now to FIG. 2 of the drawings, there is shown in greater detail the construction of two of the registers, the processor bus 16, the precharge/discharge circuits 27 and part of the control unit 14 of FIG. 1. The registers are identified in FIG. 2 as register #1 and register #2. They can be any two of the registers 17,18,19,26,32 and 35 of FIG. 1. For simplicity of illustration, only the register stages for bits ∅,1 and 15 are shown for each of register #1 and register #2. In a similar vein, only the bus conductors for bits ∅,1 and 15 of the processor bus 16 are shown.

The portion of the control unit 14 shown in FIG. 2 includes a control register 40 and a decoder 41. The control register 40 receives one microword at a time from the microword control storage unit (not shown). Each multiple-bit microword supplied to the control register 40 contains several different plural-bit control fields. One control field is used to specify the signal source mechanism, another is used to specify the signal destination mechanism, another is used to specify the ALU function, etc. Some of these control fields are encoded and require the use of the decoder 41 to produce the appropriate control point signals (e.g., L1,L2, PCB and DCB). Other of these control fields are bit significant and may be used directly without any decoding (e.g., M∅, M1 and M15). It may be desirable to provide inverter circuits, such as inverter circuits 42,43 and 44, for also providing the complements of the bit significant signals.

The bit significant signals M∅,M1, etc. shown in FIG. 2 are the mask bits which are supplied to the precharge/discharge circuits 27. They are obtained from the mask field of each microword. The PCB (precharge bus) and DCB (discharge bus) signals obtained from the decoder 41 are the control bits which are supplied to the precharge/discharge circuits 27 by way of control bus 28.

The L1 and L2 control point signals produced by the control unit 14 are the Load 1 and Load 2 signals supplied to register #1 and register #2, respectively, for purposes of loading into such registers the plural-bit binary signal then appearing on the processor bus 16. The G1 and G2 control point signals are supplied to the Gate 1 and Gate 2 terminals of register #1 and register #2, respectively, for enabling such registers to put a plural-bit binary signal onto the processor bus 16. In other words, each of the G1 and G2 signals, when active, will cause its corresponding register to produce on the processor bus 16 a binary signal corresponding to binary signal stored in such register.

The precharge/discharge (PC/DC) circuits 27 are formed on the same integrated circuit chip as is the processor bus 16 and includes separate precharge/discharge circuitry for each of the different conductors of the processor bus 16. For simplicity of illustration, only the precharge/discharge circuitry for the bit ∅,1 and 15 bus conductors are shown in FIG. 2. Though not shown, additional precharge/discharge circuits are provided for the processor bus conductors for bits 2-14.

The precharge/discharge circuitry 27 includes programmable precharge circuitry for charging none, one, some or all of the conductors of processor bus 16 to a predetermined voltage level representing a first binary value. The precharge circuitry for the bit ∅ bus conductor is comprised of an AND circuit 45 and a pair of field-effect transistors (FET's) 46 and 47, the source terminal of the latter being connected to the bit ∅ processor bus conductor by way of a conductor 48. The precharge circuitry for the bit 1 bus conductor includes an AND circuit 50, field-effect transistor 51 and field-effect transistor 52, the source terminal of the latter being connected to the bit 1 bus conductor by means of a conductor 53. The precharge circuitry for the bit 15 bus conductor includes an AND circuit 55, a field-effect transistor 56 and field-effect transistor 57, the source terminal of the latter being connected to the bit 15 bus conductor by way of a conductor 58.

The precharge/discharge mechanism 27 further includes programmable discharge circuitry for discharging none, one, some or all of the bus conductors of the processor bus 16. The discharge circuitry for the bit ∅ bus conductor includes an AND circuit 60, a field-effect transistor 61 and a field-effect transistor 62. The drain terminal of transistor 61 is connected to the conductor 48 which runs to the bit ∅ processor bus conductor. The discharge circuitry for the bit 1 bus conductor includes an AND circuit 63, a field-effect transistor 64 and a field-effect transistor 65. The drain terminal of the transistor 64 is connected to the conductor 53 which runs to the bit 1 bus conductor. The discharge circuitry for the bit 15 bus conductor includes an AND circuit 66, a field-effect transistor 67 and a field-effect transistor 68. The drain terminal of transistor 67 is connected to the conductor 58 which runs to the bit 15 processor bus conductor.

Each of the field-effect transistors 46,47, etc., shown in FIG. 2 is of the enhancement mode type. As such, a positive voltage applied to its gate electrode in excess of the cutoff threshold will cause such transistor to become conductive to pass current from its drain electrode to its source electrode.

The PCB precharge bus control signal from decoder 41 is supplied to the AND circuits 45,50 and 55 of each of the individual precharge circuits. No precharging of a processor bus conductor can occur unless this PCB control signal line is activated to provide thereon a positive voltage level. The DCB discharge bus control line from decoder 41 is, on the other hand, supplied to the AND circuits 60,63 and 66 in the individual discharge circuits for the different processor bus conductors. No discharging of any processor bus conductor can occur unless this DCB line is activated to provide thereon a positive voltage level. Clock pulses from the clock generator 15 are supplied by way of conductor 69 to the gate electrodes of transistors in each of the individual precharge and discharge circuits for each of the different processor bus conductors. This provides an ANDing function for the clock pulses. In particular, precharging and discharging of the processor bus conductors can occur only when a positive clock pulse is present on the clock conductor 69. This separate clocking function is optional and may be omitted in some data processor embodiments.

The mask bits MØ,M1, . . . ,M15 and their complements obtained from the 16-bit mask field of each microword are used to program the individual precharge and discharge circuits for the different processor bus conductors. In particular, the uncomplemented mask bits MØ,M1 and M15 are respectively supplied to the different ones of the AND circuits 60,63 and 66 in the individual discharge circuits. The logic is such that the processor bus conductors will be discharged according to the "one" value bits in the mask field provided, of course, that the DCB discharge control line is at a high level and a positive clock pulse is present on the clock conductor 69.

For the first individual discharge circuit 60,61 and 62, for example, if the MØ mask bit line is at a positive voltage level (binary "one" value) and the DCB line is also high, the AND circuit 60 will produce a positive voltage at its output to turn on the transistor 62. If a positive clock pulse is also present on clock conductor 69, then the transistor 61 is also turned on. This provides a discharge path for the bit Ø processor bus conductor by way of transistors 61 and 62 to circuit ground. This causes the bit Ø bus conductor to be discharged to a zero voltage level. In a typical implementation, approximately ten nanoseconds are required to discharge a processor bus conductor. Conversely, if all other conditions remain the same except that the MØ mask bit conductor is at a zero voltage level (binary "zero" value), then AND circuit 60 remains disabled, transistor 62 is not turned on and no discharge path is provided through the transistors 61 and 62 for the bit Ø processor bus conductor.

In a similar manner, the other mask bits M1,M2, etc. are coded to determine whether the processor bus conductors for bit 1, bit 2, etc. are discharged by the precharge/discharge circuits 27.

The individual precharge circuits are programmed by the complemented mask bits M̄Ø,M̄1, etc. to determine which, if any, of the processor bus conductors are charged. The logic is such that the processor bus conductors are charged according to the "zero" value bits in the MØ-M15 mask field. In other words, when the PCB precharge control line is high and the clock pulse is present on conductor 69, those processor bus conductors for which their corresponding mask bits have a binary "zero" value are charged to a voltage level of +V. Those processor bus conductors for which the mask bits have a binary "one" value are not charged.

Actually, the voltage level to which each processor bus conductor is charged will be less than +V by the amount of the voltage drop across the two transistors which connect the +V source to the bus conductor. For simplicity of explanation, however, the bus conductors will be referred to herein as being charged to the +V level.

Considering, for example, the individual precharge circuitry 45,46 and 47 for the bit Ø processor bus conductor, if the MØ mask bit for this precharge circuitry has a binary "zero" value, then such zero value is inverted by inverter 42 to provide an M̄Ø value of one. This one value enables the lower input of the AND circuit 45. If the PCB precharge control line is also high, AND circuit 45 produces a high level output which is supplied to the gate electrode of transistor 46. This turns on the transistor 46. If a clock pulse is also present on conductor 69, then transistor 47 is also turned on. With both transistors 46 and 47 turned on, a charging path is provided from the positive voltage source +V to the bit Ø processor bus conductor by way of such transistors 46 and 47 and the conductor 48. This charges the bit Ø processor bus conductor to the voltage level of +V. In a typical implementation, approximately 15 nanoseconds is required to charge a processor bus conductor. This is somewhat slower than the time required to discharge a bus conductor.

If, on the other hand, the M̄Ø mask bit had had a binary value of "one", then the complemented MØ line would have had a zero value and AND circuit 45 would have remained disabled to keep the transistor 46 turned off to prevent any charging of the bit Ø processor bus conductor.

The remaining individual precharge circuits function in a similar manner in response to their respective mask bits M1,M2, etc. to charge only those conductors of processor bus 16 for which the mask bit in control register 40 has a binary "zero" value.

As indicated in FIG. 3, each microword supplied to the control register 40 includes a three-bit precharge/discharge control field. If this control field is encoded to have a value of "X11", then the DCB discharge bus control line is activated. If the control field is coded to have a value of "11X", then the PCB precharge bus control line is activated. In both cases, the "X" bit value denotes a "don't care" condition. If the three-bit control field is encoded to have a value of "111", then both the PCB precharge and the DCB discharge control lines are activated at the same time. This is called a "BUS" control code and enables a charging of some conductors and a discharging of other conductors of the processor bus 16 at one and the same time. In particular, those bus conductors for which the mask bits have a binary one value are discharged and those conductors for which the mask bits have a zero value are charged. Among other things, the use of this BUS control code enables the precharge/discharge circuits 27 to generate a preprogrammed plural-bit binary number signal on the processor bus 16. This preprogrammed binary signal may be, for example, a numerical constant which is needed in the execution of a particular processor instruction.

In the processor embodiment described herein, so-called "negative logic" is employed for the data signals on the processor bus 16. In particular, a zero voltage level on a processor bus conductor is used to represent a logical value of "one". Conversely, a voltage level of +V on a processor bus conductor is used to represent a logical value of "zero". Thus, a discharged bus conductor represents a logical "one" and a charged bus conductor represents a logical "zero".

FIG. 4 shows in greater detail the construction of a single register stage 70. With the exception of SAR 31, each individual bit stage in each of the registers which are coupled to the processor bus 16 is constructed in the manner shown in FIG. 4. The stages in SAR 31 are of a similar construction except that no output connections are provided to the processor bus 16. Thus, for example, the bit Ø stage of register #1 of FIG. 2 is constructed in the manner shown in FIG. 4, and so is the bit 1 stage for register #1 and so is each of the other bit stages of register #1 and register #2 of FIG. 2.

All of the transistors shown in FIG. 4 are metal oxide type field-effect transistors which are formed on the same integrated circuit chip as is the processor bus 16. Conductor 16n represents one of the conductors of the processor bus 16.

The heart of the register stage 70 is a bistable circuit provided by transistors 71, 72, 73 and 74. Either one or the other, but not both, of transistors 72 and 74 will be in a conductive condition at any given moment, the particular one which is conductive serving to represent the binary value which is being stored by the register stage 70. If a logical "one" is being stored, then transistor 72 is conductive and transistor 74 is turned off. Conversely, if a logical "zero" is being stored, then transistor 74 is conducting and transistor 72 is turned off.

Transistors 72 and 74 are enhancement mode type transistors, while transistors 71 and 73 are depletion mode type transistors. The source terminals of transistors 71 and 73 are connected to their respective gate terminals to provide a desired pull-up action.

The input side of register stage 70 is connected to the processor bus conductor 16n by way of an input conductor 75. This input conductor 75 is connected by way of a pass transistor 76 to the input of an inverter circuit provided by transistors 77 and 78. The junction between inverter transistors 77 and 78 drives a first input of a NAND circuit formed by transistors 79 and 80. The second input of this NAND circuit is represented by the gate electrode of the transistor 80. This gate electrode is connected to a "Load" control signal conductor 81, the same as is the gate electrode of the pass transistor 76. The uninverted output of the pass transistor 76 is also supplied by way of conductor 82 to a first input of a NAND circuit formed by transistors 83 and 84. The second input of this NAND circuit is represented by the gate electrode of transistor 84 and is connected to the load control conductor 81.

When the load control conductor 81 is active, as represented by a +V voltage level thereon, the register stage 70 is set to the same logical value as appears on the processor bus conductor 16n. When the load control conductor 81 goes inactive, this logical value is then stored by the register stage 70.

Assuming, for example, that the bus conductor 16n is at a zero voltage level (logical value of "one"), then when the load control conductor 81 goes active, this zero voltage level is passed by the transistor 76 and inverted by the transistor 77 to provide a positive voltage value at the gate electrode of transistor 79. At the same time, this zero voltage level on bus conductor 16n is supplied by way of transistor 76 and conductor 82 to provide a zero input voltage at the gate electrode of transistor 83. Since transistors 80 and 84 are at this time being activated by the load signal on load control conductor 81, the positive voltage at the gate of transistor 79 turns on transistor 79 to provide a current flow path from a junction point 85 via transistors 79 and 80 to circuit ground. This places the junction point 85 at a zero voltage level. This zero level at junction point 85 turns off transistor 74 in the event that it was previously conducting. At the same time, the zero voltage level at the gate electrode of transistor 83 keeps the transistor 83 turned off. The off conditions of transistors 74 and 83 produce a positive voltage level at the junction point 86. This positive voltage level is supplied to the gate electrode of transistor 72 to turn it on in the event that it was not previously on.

Termination of the load control signal on conductor 81 turns off the transistors 80 and 84. This isolates the bistable circuit transistors 72 and 74 so that they can no longer be effected by any signal appearing at the output of the pass transistor 76. The cross-coupling of the bistable circuit transistors 72 and 74 enables them to preserve the logical condition that existed just before the transistors 80 and 84 were turned off. For the present example, this logical condition is the logical "one" condition represented by the transistor 72 being turned on and the transistor 74 being turned off. Termination of the load signal on conductor 81 also turns off the pass transistor 76 to isolate the input of the register stage 70 from the processor bus conductor 16n.

In a similar manner, it can be shown that if the processor bus conductor 16n had been at a positive voltage level (logical "zero" value) during the occurrence of the load control signal on conductor 81, then the bistable circuit transistors 72 and 74 would have been set to represent the logical "zero" condition. Such condition is represented by transistor 74 being turned on and transistor 72 being turned off.

Of particular importance for the present embodiment of the invention is the manner of construction of the output circuit portion of register stage 70. This output circuit portion couples the register stage 70 to the processor bus conductor 16n for purposes supplying the logical value stored in the register stage to the bus conductor. This output circuit portion is formed by series-connected transistors 88 and 89. The drain terminal of transistor 88 is connected to the bus conductor 16n by means of output circuit conductor 90. The gate terminal of transistor 88 is connected to the junction point 86, while the gate terminal of transistor 89 is connected to a gate control signal conductor 91.

Activation of the gate control conductor 91 via a positive voltage gating signal enables the output circuit transistors 88 and 89 to discharge the processor bus conductor 16n, provided that the bistable circuit transistors 72 and 74 are representing a logical "one" condition. For this logical "one" condition, the bistable circuit transistor 74 is turned off and the junction point 86 is at a positive voltage level. This enables the output circuit transistor 88. The enabling of the second output circuit transistor 89 by the positive gating signal on conductor 91 causes both of transistors 88 and 89 to become conductive to provide a discharge path for bus conductor 16n via conductor 90 and transistors 88 and 89 to circuit ground. The resulting discharged condition for bus conductor 16n represents a logical "one" value, which is the desired result.

If, on the other hand, the bistable circuit formed by transistors 72 and 74 is representing a logical "zero" condition, then transistor 74 is conductive and the junction point 86 is at a zero voltage level. Upon occurrence of the positive gating signal on conductor 91, the transistor 88 remains in a turned off condition because of the zero voltage level at the junction point 86. In this case, no discharge path is provided and the condition of processor bus conductor 16n is not altered by the register stage 70. In this regard, the processor bus conductor 16n is normally precharged to a positive voltage level of +V prior to each occurrence of a positive gating signal on gate control conductor 91. Thus, if the bistable circuit 72, 74 is storing a logical "zero" value, the output transistor 88 remains turned off and the precharged condition of the bus conductor 16n is allowed to remain. This charged condition for bus conductor 16n represents a logical "zero" value, which is the desired result.

With reference to FIG. 2 and considering the processor bus 16 as a whole, if it is desired that register #1, for example, should be the signal source mechanism and that the binary number stored therein should be transferred to the processor bus 16, then all 16 conductors of the processor bus 16 are initially charged to the positive voltage level +V by the precharge/discharge circuits 27. Thereafter, the Gate 1 (G1) control line for the register #1 is activated. This enables the output circuits for those register stages which are storing a logical "one" value to cause a discharging of their respective bus conductors. On the other hand, the output circuits of those register stages which are storing a logical "zero" value remain disabled to allow their respective bus conductors to remain in a charged condition. In this manner, there is produced on the processor bus 16 a plural-bit binary signal which is the same as the plural-bit binary signal stored in the register #1.

A similar procedure is followed for each of the other registers coupled to the processor bus 16 when they are selected to serve as the signal source mechanism.

The output circuit of each stage in each of the registers 17,18,19,26,32 and 35 is constructed in the manner shown in FIG. 4 to enable only a discharging of its respective processor bus conductor. The output circuits of instruction and data address counters 22 and 23 are likewise constructed in this same manner to enable only a discharging of their respective bus conductors. Also, each of the individual gating circuits in the set of ALU output gates 21 is constructed in the manner represented by output circuit 88,89,90 of FIG. 4 to enable only a discharging of the processor bus conductor to which it is connected. In such case, the gate terminal of the output transistor 88 would be connected to the appropriate output line from the ALU 20. In this regard, ALU 20 has no output register and hence no output register stages. It has only the gated output circuits 21, each of which is of the form represented by the output circuit provided by elements 88,89 and 90 of FIG. 4.

OPERATION OF THE PREFERRED EMBODIMENT

The improved signal transfer mechanism of the present embodiment uses the processor bus 16 as a storage device. The inherent capacitance of the processor bus conductors provides the storage medium. In a practical implementation of the present embodiment, the processor bus 16 can store binary signal values for as long as 20 microseconds or more without any significant degradation of the signal values. By way of comparison, a period of 50 nanoseconds has been found to be a suitable length of time for each processor control cycle or microword cycle in a large scale integration data processor. Thus, the processor bus 16 can store a plural-bit binary signal for a goodly number of processor control cycles without impairing the reliability of the signal.

This technique can be used to buffer data without need for the customary buffer register hardware. Thus, a plural-bit binary data signal can be supplied to the processor bus 16 by a signal source mechanism during a first processor control cycle. Such data signal can then be allowed to remain on the processor bus 16 for one or more subsequent processor control cycles before being taken in by a signal destination mechanism. This buffering of the data signal is accomplished without use of any buffer register hardware. Instead, the inherent capacitance of the processor bus conductors provides the buffering or storage medium.

This buffering technique is particularly useful for the case of signal source mechanisms which do not have an output register. With reference to FIG. 1, this is the case for the ALU 20. ALU 20 has no output register. Instead, the output data from the ALU 20 is placed on the processor bus 16 during a first processor control cycle and the processor bus 16 is made to function as the output buffer or output register for the ALU 20. This ALU output data can thereafter be taken in during a subsequent processor control cycle by the appropriate signal destination mechanism such as, for example, the local storage data register 26. The placing of the ALU output data on the processor bus 16 and the taking in of the data by LSDR 26 or some other signal destination mechanism are controlled by the appropriate control point signals from the control unit 14 and hence by the microcode located in the control unit 14.

Another way of looking at it is that the use of the processor bus 16 as a buffer storage device can sometimes eliminate the need for a hardware register.

The use of the processor bus 16 as a storage device is also helpful in those situations where a given plural-bit binary word is needed by different signal destination mechanisms during different processor control cycles. In this case, the binary word can be placed on the processor bus 16 by a source register and immediately taken in or copied by a first destination register. The binary word nevertheless remains on the processor bus 16 and can be taken in or copied by a second destination register during a later processor control cycle.

The use of the processor bus 16 as a storage device also enables a simplification of the circuitry needed in the various registers and counters and so forth which are coupled to the processor bus 16. This is illustrated in FIG. 2 for the case of registers #1 and #2, bearing in mind that the individual bit stages in these registers have the construction shown in FIG. 4. In particular, the output circuits for the individual bit stages are only required to discharge the processor bus 16. This simplifies the construction of the register output circuits and eliminates the need for such output circuits to handle any direct-current power. This is made possible because charging of the processor bus conductors is provided by a separate set of circuits, namely the precharge/discharge circuits 27, which are separate and apart from any of the registers. Thus, only one set of charging circuits is provided which can be used for all the various sets of output circuits in the various registers, counters and other signal source mechanisms which are coupled to the processor bus 16.

The use of a single and separate set of charging circuits for all the different source mechanisms is made possible by the ability of the processor bus 16 to act as a storage device. In particular, the separate set of charging circuits in the precharge/discharge mechanism 27 is used to provide a blanket charging of all of the processor bus conductors during a first processor control cycle. The processor bus 16 then acts to store this blanket precharged condition. Thereafter, during a subsequent processor control cycle when a register wants to transfer its contents to the processor bus 16, the output circuits of such register need only discharge the appropriate conductors of the processor bus 16.

A blanket precharging of all of the conductors of processor bus 16 must occur before each transfer of the contents of a register or other signal source mechanism onto the processor bus 16. At first glance, this would appear to require an additional processor control cycle for each transfer of a binary data word onto the processor bus 16. In practice, however, it is usually possible to have the blanket precharging performed by a microword which is already present in the microword sequence for other purposes. Thus, with proper microcoding, there will be a negligible impact on the performance speed of the data processor. In fact, some of the performance improvements provided by other aspects of this invention will generally more than make up for any reduction in performance caused by the need to precharge the processor bus 16.

In order to do a blanket precharge of the processor bus 16, a microword is selected and all 16 bits in the mask field thereof are coded to have a "zero" value. The precharge/discharge control field in this same microword is also coded to have a binary value of "11∅". As indicated by the table of FIG. 3, this causes an activation of only the PCB precharge bus control line. When this microword is set into the control register 40, it causes each of the conductors of the processor bus 16 to be charged to a voltage level of +V. During a subsequent microword in the microword sequence, the source field of such microword is coded to cause an activation of the G1 (Gate 1) control point line from the decoder 41. This enables the output circuits of register #1 to enable them to discharge the appropriate processor bus conductors to produce on the processor bus 16 a plural-bit binary word corresponding to the contents of register #1. During either the same or a subsequent microword cycle, the coding of the microword destination field causes an activation of the L2 (Load 2) control point line of the decoder 41 to cause a loading into the register #2 of a replica of the plural-bit binary word present on the processor bus 16. In this manner, the plural-bit binary word is transferred from register #1 to register #2. Furthermore, after the word is copied into register #2, the word itself still remains on the processor bus 16 for further use, either with or without modification.

The additional provision of the individual discharge circuits in the precharge/discharge mechanism 27 provides a general masking capability for masking or modifying one or more of the data bits on the processor bus 16. More accurately, both the precharge circuits and the discharge circuits provide general masking capability. Thus, after a given data word is placed on the processor bus 16, one or more bits thereof may be modified to assume a logical "zero" value by activating the appropriate charging circuits in the precharge/discharge mechanism 27. In a similar manner, one or more of the bits in the data word may be modified or changed to a logical "one" value by activating the appropriate discharge circuit in the precharge/discharge mechanism 27. Thereafter, the modified data word can be loaded back into the same register from which it came or it can be loaded into some other register or signal destination mechanism.

The precharge/discharge mechanism 27 also provides an ideal mechanism for generating a desired binary data value such as a mathematical constant. This is accomplished by coding the mask field of a particular microword in accordance with the desired data value and by coding the precharge/discharge control field of such microword with a code value of "111". When this particular microword in its turn reaches the control register 40, it will cause both the PCB and the DCB control lines to be activated. This activates the appropriate individual charging and discharging circuits to produce on the processor bus 16 the data values specified by the microword mask bits M∅, M1, . . . , M15.

The use of the masking and constant value generating capabilities of the precharge/discharge circuits 27 will reduce the time required to execute some processor instructions. This, in turn, increases the performance speed of the data processor.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In large scale integration data processor circuitry formed on an integrated circuit chip, a signal transfer mechanism comprising:

a plural-bit bus formed on the integrated circuit chip for transferring plural-bit binary signals between different locations on the chip;

a microword control storage mechanism responsive to each processor instruction for producing a sequence of microwords for each processor instruction for controlling the execution of each processor instruction;

control circuitry responsive one at a time to the microwords from the control storage mechanism for producing for each microword a plurality of control point signals for controlling the operation of the data processor for one microword cycle;

plural-bit signal source circuitry formed on the integrated circuit chip and coupled to the plural-bit bus for supplying plural-bit binary signals thereto;

circuitry for supplying a control point signal produced during a first microword cycle to the signal source circuitry for enabling it to put its plural-bit binary signal onto the plural-bit bus during this first microword cycle;

plural-bit signal destination circuitry formed on the integrated circuit chip and coupled to the plural-bit bus for receiving plural-bit binary signals therefrom;

and circuitry for supplying a control point signal produced during a second and different microword cycle to the signal destination circuitry for enabling it to take in during this second microword cycle the plural-bit binary signal put out by the signal source circuitry;

the inherent capacitance of the plural-bit bus serving to store the plural-bit binary signal during the first and second and any intervening microword cycles.

2. A signal transfer mechanism in accordance with claim 1 which further includes second plural-bit signal destination circuitry formed on the integrated circuit chip and coupled to the plural-bit bus for receiving plural-bit binary signals therefrom and wherein the control circuitry is coupled to this second signal destination circuitry and enables it to take in from the plural-bit bus during a third microword cycle the same plural-bit binary signal as was taken in by the first signal destination circuitry during the second microword cycle, the inherent capacitance of the plural-bit bus serving to store the plural-bit binary signal during the second and third and any intervening microword cycles.

3. A signal transfer mechanism in accordance with claim 1 which further includes second plural-bit signal destination circuitry formed on the integrated circuit chip and coupled to the plural-bit bus for receiving plural-bit binary signals therefrom and wherein the control circuitry is coupled to this second signal destination circuitry and enables it to take in during the first microword cycle the plural-bit binary signal put on the plural-bit bus by the signal source circuitry.

4. A signal transfer mechanism in accordance with claim 1 wherein:
   the signal source circuitry is a plural-stage binary register having output circuits coupling different register stages to different ones of the bit lines of the plural-bit bus;
   and the signal destination circuitry is a plural-stage binary register having input circuits coupling different register stages to different ones of the bit lines of the plural-bit bus.

5. A signal transfer mechanism in accordance with claim 1 wherein the signal source circuitry is a plural-bit arithmetic and logic unit having output gating circuitry for coupling different arithmetic and logic unit output lines to different ones of the bit lines of the plural-bit bus and wherein the control circuitry is coupled to the output gating circuitry for enabling same for enabling the arithmetic and logic unit to put its plural-bit output signal onto the plural-bit bus during the first microword cycle.

6. In large scale integration data processor circuitry formed on an integrated circuit chip, a signal transfer mechanism comprising:
   a plural-conductor bus formed on the integrated circuit chip for transferring plural-bit binary signals between different locations on the chip;
   charging circuitry formed on the integrated circuit chip and coupled to the plural-conductor bus for charging the bus conductors to a predetermined voltage level representing a first binary value;
   a plural-bit signal source mechanism formed on the integrated circuit chip and including output circuits coupled to different ones of the bus conductors, such output circuits being constructed to enable only a discharging of their respective bus conductors, the discharged condition of a bus conductor denoting a second binary value;
   a plural-bit signal destination mechanism formed on the integrated circuit chip and coupled to the plural-conductor bus for receiving therefrom the plural-bit binary signal produced by the signal source mechanism;
   and processor control circuitry coupled to the charging circuitry and the signal source mechanism for causing the charging circuitry to charge each of the bus conductors during a first time interval and for enabling the signal source mechanism to discharge the appropriate bus conductors during a second and different time interval for producing on the bus a desired plural-bit binary signal.

7. A signal transfer mechanism in accordance with claim 6 wherein:
   the signal transfer mechanism includes a plurality of plural-bit signal source mechanisms formed on the integrated circuit chip and each including output circuits coupled to different ones of the bus conductors, such output circuits being constructed to enable only a discharging of their respective bus conductors;
   and the processor control circuitry enables only one of the signal source mechanisms during the second time interval, other of the signal source mechanisms being enabled during other second time intervals following other first time interval chargings of the bus conductors by the charging circuitry.

8. A signal transfer mechanism in accordance with claim 6 wherein:
   the data processor circuitry includes various plural-bit signal source mechanisms formed on the integrated circuit chip and coupled to the plural-bit bus;
   all signal source mechanisms, other than the charging circuitry, which are coupled to the plural-bit bus have output circuits coupled to the different bus conductors which can only discharge their respective bus conductors;
   and the processor control circuitry enables the various signal source mechanisms one at a time as needed and causes the charging circuitry to charge the bus conductors before each enabling of a signal source mechanism.

9. In large scale integration date processor circuitry formed on an integrated circuit chip, a signal transfer mechanism comprising:
   a plural-conductor bus formed on the integrated circuit chip for transferring plural-bit binary signals between different locations on the chip;
   a charge/discharge mechanism formed on the integrated circuit chip and coupled to the plural-conductor bus and including controllable charge circuitry for charging none, one, some or all of the bus conductors to a predetermined voltage level representing a first binary value and further including controllable discharge circuitry for discharging none, one, some or all of the bus conductors to a predetermined voltage level representing a second binary value;
   a plural-bit signal source mechanism formed on the integrated circuit chip and including output circuits coupled to different ones of the bus conductors, such output circuits being constructed to enable only a discharging of their respective bus conductors;
   a plural-bit signal destination mechanism formed on the integrated circuit chip and coupled to the plural-conductor bus for receiving plural-bit binary signals therefrom;
   and processor control circuitry coupled to the charge/discharge mechanism, the signal source mechanism and the signal destination mechanism for causing the charge circuitry to charge each of the bus conductors during a first time interval, for enabling the signal source mechanism to discharge the appropriate bus conductors during a second and different time interval for producing a plural-bit binary signal on the bus and for causing the charge/discharge mechanism to change the plural-bit binary signal on the bus by changing the charge condition of one or more of the bus conductors to represent the opposite of its current binary value.

10. In large scale integration data processor circuitry formed on an integrated circuit chip, a signal transfer mechanism comprising:

a plural-conductor bus formed on the integrated circuit chip for transferring plural-bit binary signals between different locations on the chip;

a precharge/discharge mechanism formed on the integrated circuit chip and coupled to the plural-conductor bus and including programmable precharge circuitry for charging none, one, some or all of the bus conductors to a predetermined voltage level representing a first binary value and further including programmable discharge circuitry for discharging none, one, some or all of the bus conductors to a predetermined voltage level representing a second binary value;

a plural-bit signal source mechanism formed on the integrated circuit chip and including output circuits coupled to different ones of the bus conductors, such output circuits being constructed to enable only a discharging of their respective bus conductors;

a plural-bit signal destination mechanism formed on the integrated circuit chip and coupled to the plural-conductor bus for receiving plural-bit binary signals therefrom;

and processor control circuitry coupled to the precharge/discharge mechanism, the signal source mechanism and the signal destination mechanism for causing the precharge circuitry to charge each of the bus conductors during a first time interval, for enabling the signal source mechanism to discharge the appropriate bus conductors during a second and different time interval for producing a plural-bit binary signal on the bus and for causing the precharge/discharge mechanism to generate a preprogrammed plural-bit binary signal on the bus during a time interval different from both the first and second time intervals.

* * * * *